United States Patent [19]
Schmidt

[11] 3,743,120
[45] July 3, 1973

[54] VEHICLE WITH SELF-CONTAINED LOAD TRANSFER SYSTEM

[75] Inventor: Kenneth J. Schmidt, Thurston, Oreg.

[73] Assignee: General Trailer Company, Inc., Springfield, Oreg.

[22] Filed: Aug. 4, 1971

[21] Appl. No.: 168,980

[52] U.S. Cl. ............ 214/38 BA, 214/1 H, 214/515, 238/13
[51] Int. Cl. ............................................. B65g 67/24
[58] Field of Search ...................... 214/38 B, 38 BA, 214/38 D, 1 H, 515; 238/13

[56] References Cited
UNITED STATES PATENTS

| | | | |
|---|---|---|---|
| 3,587,890 | 6/1971 | Hyland | 214/44 R X |
| 3,618,797 | 11/1971 | Pratt | 214/38 BA |
| 3,231,121 | 1/1966 | Powell | 214/515 |

*Primary Examiner*—Robert G. Sheridan
*Attorney*—Kolisch, Hartwell & Dickinson

[57] ABSTRACT

A trailer with a self-contained load-transfer system. The trailer includes a frame, and a suspension supporting the frame which can be adjusted selectively to change the frame's elevation above the ground. Incorporated in the frame are transversely extending track members, adjacent opposite ends of which are mounted laterally shiftable and vertically swingable track extenders that can be moved to positions forming longitudinal extensions to the track members. The extenders are adapted for connection (when extended) to supports external to the trailer, and when so connected swing between raised and lowered positions relative to the frame with lowering and raising, respectively, of the frame relative to the ground. Such swinging functions in cooperation with track-riding carriages that can be detachably connected to the base of a load to accommodate picking up and depositing of a load on the frame. The carriages, track members and extenders facilitate lateral shifting of a load relative to the frame.

4 Claims, 8 Drawing Figures

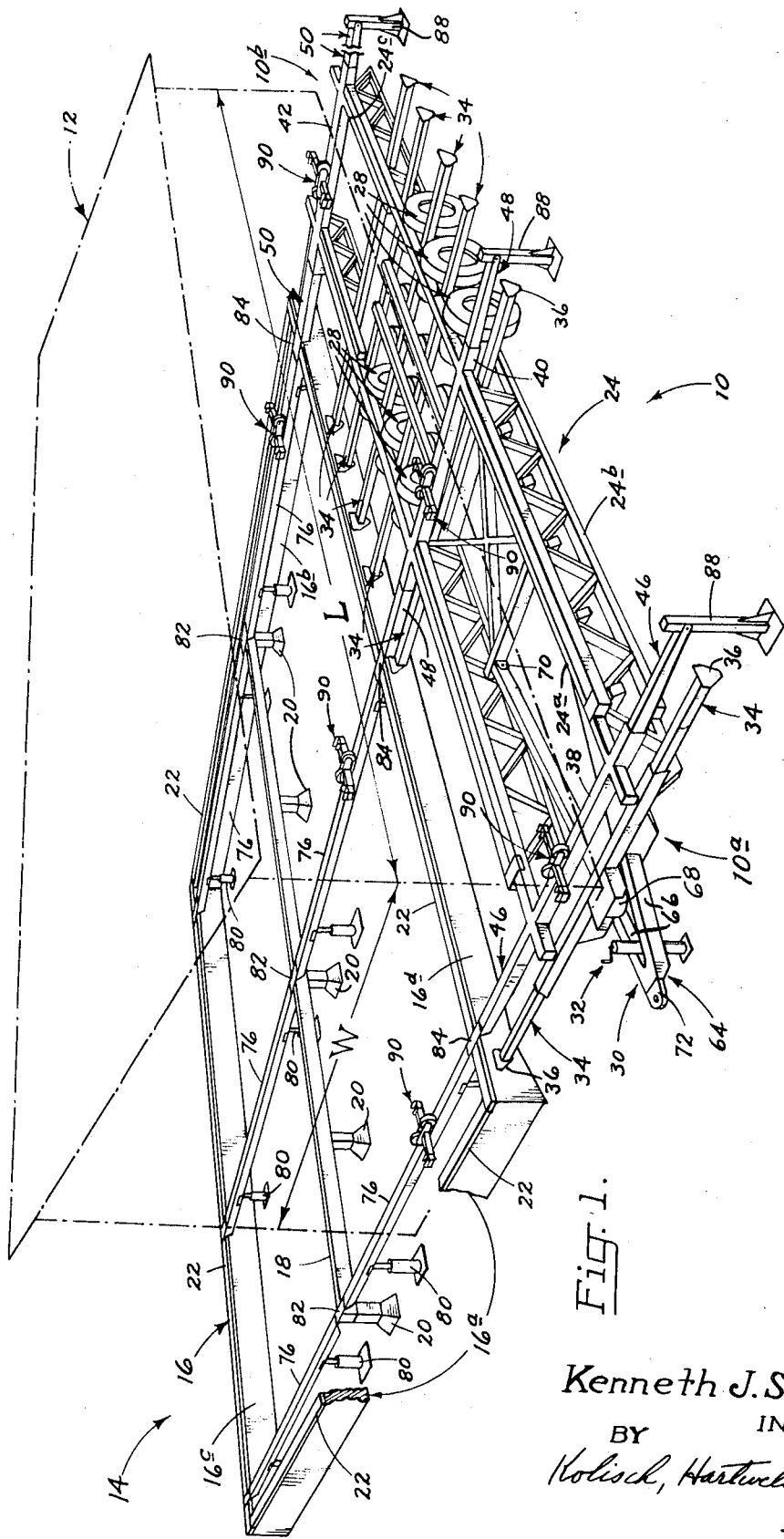

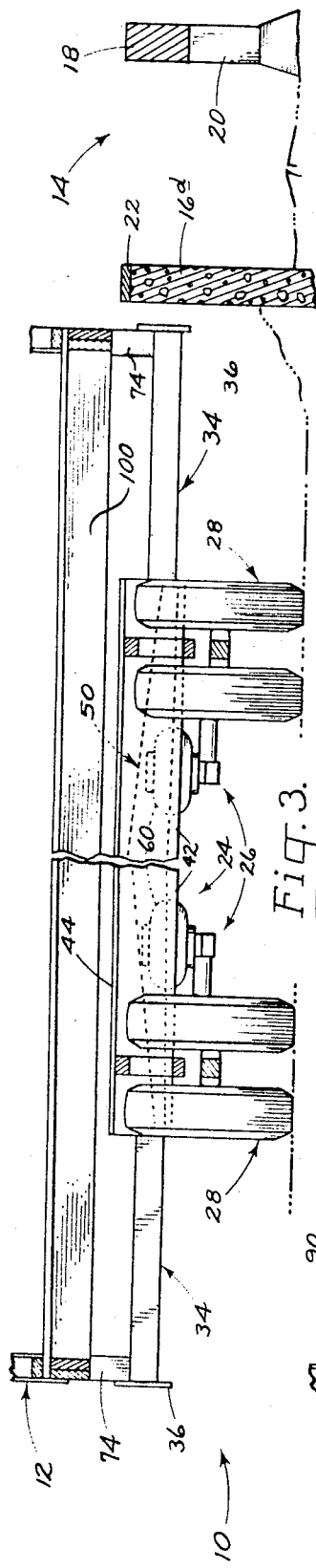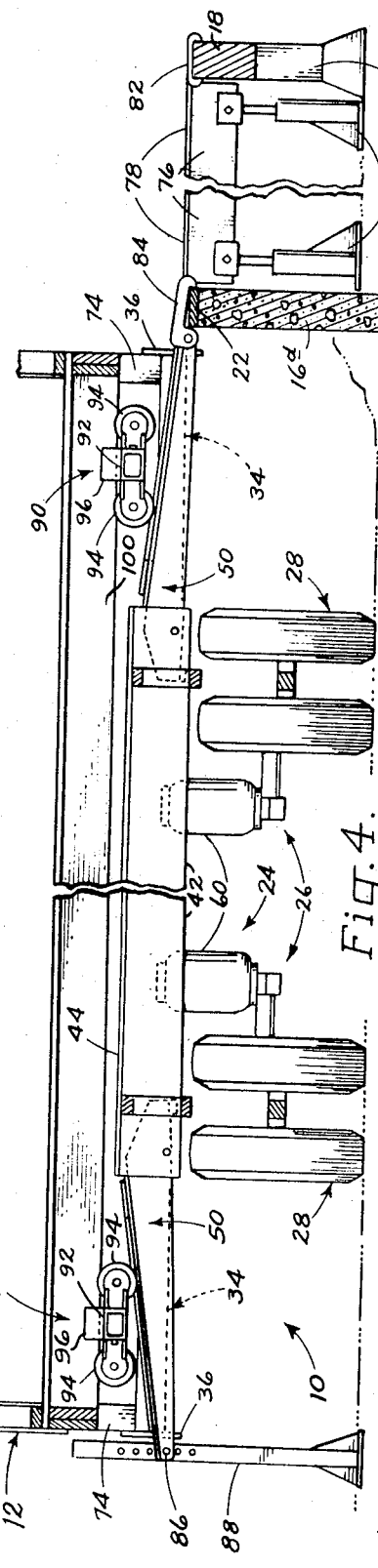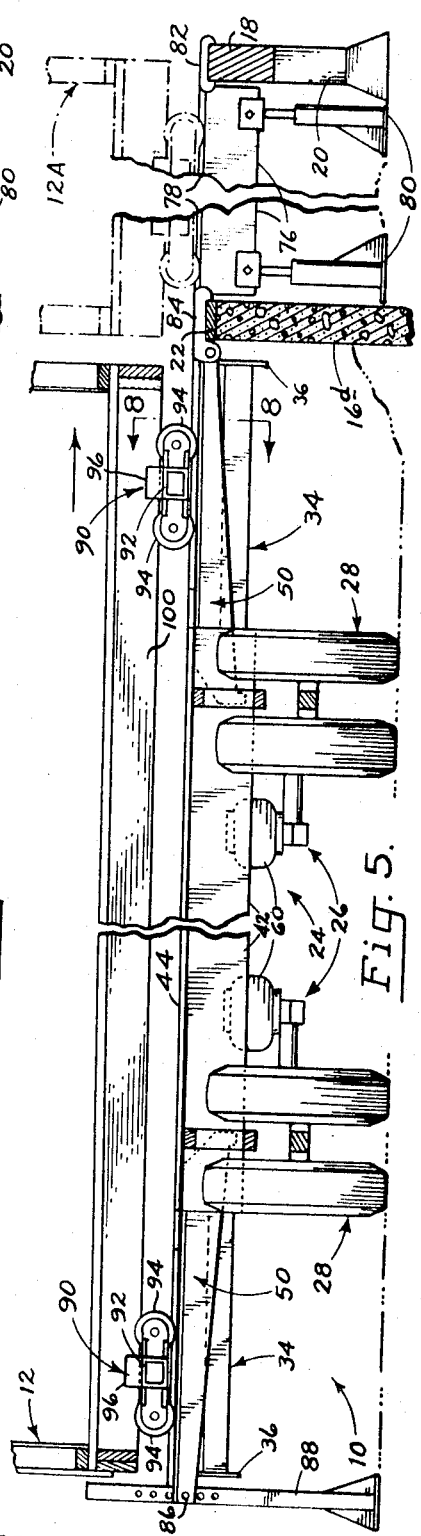

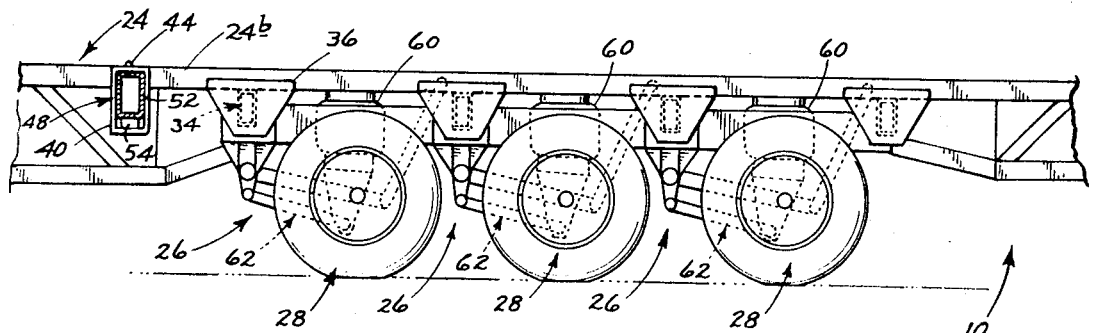
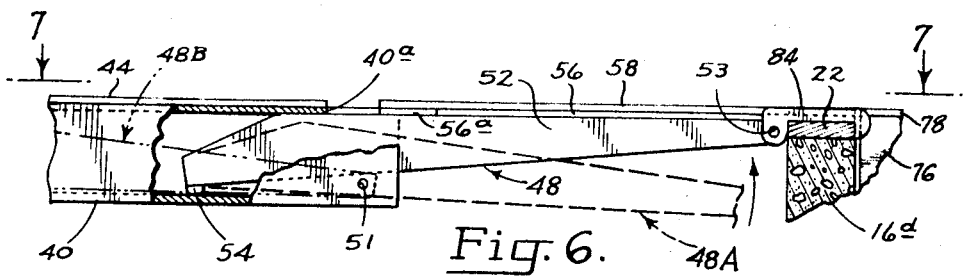
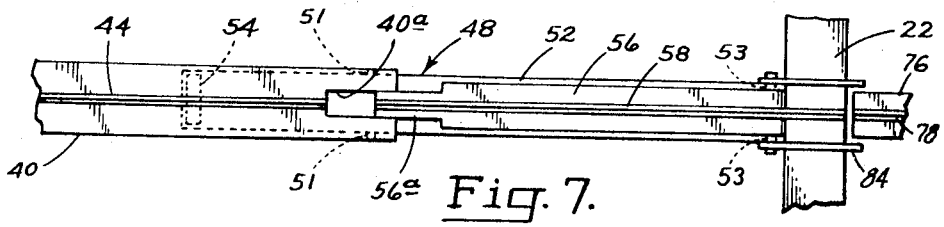
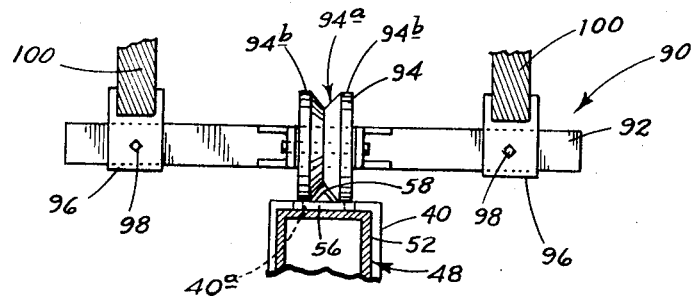

VEHICLE WITH SELF-CONTAINED LOAD TRANSFER SYSTEM

BACKGROUND AND SUMMARY OF THE INVENTION

This invention pertains to a load-transporting vehicle, and more particularly to a self-contained load-transfer system in such a vehicle. For the purpose of illustration herein, a preferred embodiment of the invention is described in conjunction with a trailer for transporting prefabricated modular home units.

Various types of relatively large and bulky, essentially unitized, loads are now transported from point-to-point by trailers hauled behind conventional heavy duty tractors. One type of load of this general description which has become of interest in recent years is a so-called modular home unit. Such a unit typically comprises an elongated preassembled portion of a home, which portion is intended to be transported from its fabrication site to a foundation site where it will be joined with one or more additional units to make up the final home. Such a unit normally comprises relatively conventional wood frame construction, and typically has a width either of about 12 or 14 feet, and a length of about 48, 52 or 60 feet.

The handling and transporting of such a unit presents a number of problems which heretofore have not been taken care of completely satisfactorily. One of the principal handling difficulties encountered with such a unit is how properly and safely to transfer the unit into and off of the transporting trailer or truck frame. The large size and relative fragility and nonrigidity in such a unit makes this kind of operation especially tricky. A unit improperly supported or moved during such an operation can easily twist, crack or otherwise be damaged.

A general object of the present invention therefore is to provide a novel on-board load-transfer system in a transporting vehicle which accommodates relatively simple and safe on and off loading of a load, such as a unit of the type described above, in a practical and satisfactory manner.

More specifically, an object of the invention is to provide such a system which employs in a vehicle the novel combination of a vertically adjustable suspension that is operable to raise and lower the load-supporting frame in the vehicle, and a track arrangement in the frame including vertically adjustable portions which, with raising and lowering of the frame, work in conjunction with carriages automatically to pick up and deposit a load relative to the frame.

According to a preferred embodiment of the invention, a trailer or like frame is provided with a supporting suspension which can be adjusted selectively to change the frame's elevation above the ground. In the specific embodiment disclosed herein, the suspension means comprises air gags whose levels of inflation can be changed. Incorporated rigidly in the frame are transversely extending track members, adjacent opposite ends of which are mounted laterally shiftable and vertically swingable track extenders that can be moved outwardly and upwardly to positions forming longitudinal extensions to the track members. The track extenders are adapted for connection (when extended) to supports external to the frame, and when so connected, swing between raised and lowered positions relative to the frame with lowering and raising, respectively, of the frame relative to the ground.

Such swinging of the track extenders functions in cooperation with track-riding carriages, that can be detachably connected to the base of a load, to accommodate picking up and depositing of a load relative to the frame. The carriages, track members, and track extenders facilitate lateral shifting of a load relative to the frame.

DESCRIPTION OF THE DRAWINGS

These and other objects and advantages attained by the invention will become more fully apparent as the description which follows is read in conjunction with the accompanying drawings, wherein:

FIG. 1 is a perspective view, somewhat simplified, illustrating a trailer containing a load-transfer system as contemplated herein, with the trailer positioned adjacent a foundation, and with a modular home unit that has been carried on the trailer shown in a condition being off-loaded from the tailer onto the foundation;

FIG. 2 is a fragmentary side elevation, on a larger scale than FIG. 1, illustrating an adjustable suspension provided for the frame in the trailer in FIG. 1;

FIGS. 3, 4 and 5 are rear longitudinal axial views of the trailer in FIG. 1, in about the scale as FIG. 2, further illustrating the system of the present invention, and showing successive stages in an unloading operation;

FIG. 6 is a fragmentary side elevation, on a larger scale than FIGS. 3, 4 and 5, illustrating details of a track and a track extender as contemplated herein;

FIG. 7 is a view taken generally along the line 7—7 in FIG. 6; and

FIG. 8 is a fragmentary view, on a larger scale than FIGS. 6 and 7, taken generally along the line 8—8 in FIG. 5.

DETAILED DESCRIPTION OF THE INVENTION

Turning now to the drawings, and referring first to FIG. 1, indicated generally at 10 is an elongated ground-traveling trailer which incorporates an on-board load-transfer system as contemplated herein. The trailer includes a front end 10a, which is toward the viewer in FIG. 1, and a rear end 10b, which is away from the viewer in the figure. Trailer 10 is adapted to handle modular home units of the type outlined above, and such a unit is shown generally in dash-dot outline at 12 in FIG. 1, in a condition partially unloaded from the trailer onto the near side of an adjacent foundation 14 alongside of which the trailer has been parked. For the purpose of simplifying FIG. 1, the trailer is shown in a condition uncoupled from the usual hauling tractor.

Unit 12 is a half-home unit having a width W of about 12 feet and a length L of about 48 feet. This unit is adapted to be placed on the half-side of foundation 14 which is directly adjacent trailer 10, and is further adapted to be joined with another similar unit placed on the other half-side of the foundation.

Foundation 14 is conventional in construction, including a rectangular poured concrete perimeter wall 16, and a longitudinal center beam 18 which is supported on concrete pillars 20. Wall 16 includes spaced-apart parallel ends 16a, 16b which are about 24 feet long, joined with spaced-apart parallel sides 16c, 16d which are about 48 feet long. Suitably mounted on the tops of the ends and sides in wall 16 are conventional elongated wooden sills 22. The top surfaces of sills 22 and beam 18 occupy a common, substantially horizontal plane which is at an elevation of about 30 inches above the level of the ground underlying trailer 10.

The trailer, parked as shown in FIG. 1, is disposed with its longitudinal axis substantially parallel to side 16d in wall 16 and at a distance of about 7 feet from this side. In addition, the trailer is positioned with the opposite ends of unit 12 properly aligned with opposite ends 16a, 16b in wall 16.

Considering the construction of trailer 10, and referring to FIGS. 1 and 2, the trailer includes: an elongated frame 24; a plurality (namely six) of vertically adjustable suspensions, such as those shown at 28 in FIG. 2, which carry conventional axle-mounted wheel sets 28; and a vertically adjustable drawbar mechanism 30 (see FIG. 1). Wheel sets 28 support the rear portion of the frame for travel over the ground, and thus are referred to herein also as ground-traveling support means. The front portion of the trailer frame, with the latter traveling over the ground, is normally supported through drawbar mechanism 30 on the frame of a conventional hauling tractor, to which the lead end of the drawbar mechanism is suitably coupled. However, with the trailer parked, as shown in FIG. 1, detached from any tractor, the front portion of frame 24 is supported by a conventional crank-operated adjustable support mechanism 32 which is mounted adjacent the front end of the drawbar mechanism.

Except to the extent that will be described hereinafter, frame 24 is relatively conventional in construction. The particular frame illustrated is what might be thought of as a sectionalized frame which is constructed for both longitudinal and lateral extension and contraction, thus enabling it readily to accommodate modular home units of different sizes. The frame thus includes suitably longitudinally telescopically joined front, central and rear sections 24a, 24b, 24c, respectively, the opposite sides of which carry telescopically mounted lateral extension members 34. The three sections in the frame each comprise a rigid unit formed from the usual interconnected longitudinal and transverse members, braced by suitable braces. The lateral extension members are slidably received in transversely extending tubes provided in the various frame sections, such tubes, in some cases, forming structural transverse members in the sections. The outer ends of extension members 34 carry upwardly projecting retainer plates, such as those shown at 36, which prevent lateral slippage of a load carried on the trailer.

By adjusting the positions of front and rear frame sections 24a, 24c on central section 24b, the length of frame 24 can be adjusted between a minimum of about 37 feet, the frame being illustrated herein with a length of about 48 feet, and a maximum of about 57 feet. Similary, through adjusting the positions of the lateral extension members on the various frame sections, the overall width of the frame can be adjusted between a minimum of about 12 feet and a maximum of about 14 feet. As illustrated herein, the extension members are adjusted to give the frame an overall width of about 12 feet—suitable for handling home unit 12. Appropriate conventional means is, of course, provided for releasable locking the frame sections and extension members in different desired positions relative to one another.

It is thus apparent that frame 24 can be adjusted to provide what might be thought of as a load-support deck which may be as small as about 12 feet by 37 feet, and as large as about 14 feet by 57 feet. Home units having widths up to about 14 feet can thus be readily taken care of. Home units having a length greater than 57 feet, and up to about 60 feet, can also be taken care of, with an end of the unit, with the unit supported on the trailer, overhanging the rear end of the trailer frame. In order to assure proper balancing of a load on the frame, it is customary to adjust the lateral extension members whereby the width of the load-support deck which they define is substantially centered laterally with respect to the longitudinal axis of the frame. Members 34 are shown so adjusted herein.

Joined rigidly in frame 24, according to the present invention, are three elongated transversely extending track members, shown at 38, 40, 42. These track members are each about 8 feet long herein, and comprise elongated, hollow, substantially rectangular cross section tubes. Member 38 is provided in frame section 24a adjacent the front end thereof, member 40 in frame section 24b immediately in front of the forwardmost wheel sets 28, and member 42 in section 24c adjacent the rear end thereof. These track members may, and in the case being described do, form integral transverse structural parts of the particular frame sections in which they are included. The top surfaces of these track members are referred to herein as track surfaces.

Referring to FIGS. 6 and 7 along with FIG. 2, suitably joined to and extending along the top surfaces of members 38, 40, 42, substantially centrally thereon (relative to the opposite sides of the surfaces), are elongated inverted angle iron members, such as angle iron member 44 shown in FIG. 2 on the top surface of track member 40. Further, provided in such surfaces, adjacent opposite ends of the track members, are rectangular notches, such as notch 40a shown in FIGS. 6 and 7 adjacent the right end of member 40 in the figures. These notches each have a length (measured longitudinally of the associated track member) of about 6 to 7 inches, and a width of about 3 inches. The angle iron members on the various track members extend between the inner ends of the notches in the members. This can be seen clearly in FIGS. 6 and 7 with respect to the right end of angle iron member 44 and the inner left end of notch 40a.

Also provided in frame 24 according to the present invention are three pairs of elongated track extenders 46, 48, 50 for track members 38, 40, 42, respectively. These track extenders are substantially the same in construction, and one of extenders 48 is shown in detail in FIGS. 6, 7 and 8. Extender 48 comprises an elongated tubular arm 52 having a length slightly less than 4 feet herein, and a side configuration as illustrated in FIG. 6. Joined to the base of arm 52, adjacent the left end thereof in FIGS. 6 and 7 is a block 54. Joined to the top surface of arm 52, as shown in FIGS. 6 and 7, is an elongated plate 58. The opposite sides of the left end of this plate in FIGS. 6 and 7 are notched to provide a reduced-width end projection 56a which is adapted to fit within notch 40a. Projection 56a has a length slightly less then the length of notch 40a, and a width slightly less than the width of the notch. It will be noted that with the various parts in the relative positions shown in FIGS. 6 and 7, the left end of projection 56a terminates short of the left end of notch 40a. Plate 58 has a thickness which is substantially the same as the thickness of the upper wall in the tube forming track member 40.

The top surface of plate 56 herein constitutes a track extension surface. Joined centrally to and extending along this surface is an inverted angle iron member 58 whose cross-sectional configuration and dimensions are substantially the same of those of the angle iron members previously mentioned.

The track extenders are slidably and telescopically received within the hollow interiors of their respective associated track members. It will be noted, for example, in FIGS. 6 and 7 that the left end of extender 48 in these figures is freely received within the hollow interior of member 40. According to the present invention, the track extenders are adapted to be shifted between retracted and extended positions, and also between lowered and raised positions. These various positions are illustrated clearly in FIG. 6 for the track extender 48 shown therein.

More specifically, extender 48 is shown in solid outline in an extended and raised position. In this position, the extender extends longitudinally outwardly from member 40, with block 54 bearing against the bottom wall in member 40, and with the upper left end of extender 48 bearing against the inside of the upper wall in member 40. The top surfaces of plate 56 and of member 40 are longitudinally and horizontally aligned, with angle iron members 44, 58 also so aligned. Projection 56a is received within notch 40a. In dashed outline at 48A in FIG. 6, extender 48 is shown in an extended but lowered position, with the extender essentially completely supported on the bottom wall in member 40. In its lowered position, extender 48 can be shifted freely into and out of member 40, and in particular, can be shifted inwardly to a retracted position such as that shown in dash-double-dot outline at 48B in FIG. 6. The track extender can be locked in its retracted position in any suitable manner, as by extending a pin through pairs of suitably aligned accommodating bores 51, 53 provided adjacent the outer ends of member 40 and arm 52, respectively.

Referring to FIG. 2, previously mentioned suspensions 26 are mounted on frame section 24b. According to the present invention, and as was already briefly mentioned herein, these suspensions are vertically adjustable, whereby they may be adjusted to change the elevation of frame 24 above the ground. Preferably, suspensions 26 each comprise an extensible-contractible air bag whose level of inflation may be changed to bring about the adjustment mentioned. Accordingly, suspensions 26 each include an air bag, such as those shown at 60, which acts generally vertically between overlying members in frame section 24b and the pair of wheels in a wheel set 28. More specifically, an air bag 60 acts between such frame members and a pivoted rock structure, such as rock structures 62, which is pivoted to frame section 24b and which carries axles supporting the wheels in a wheel set. A suspension including an air bag is preferred because of the cushioning which such a bag provides for a trailer frame, and also because of the relative ease with which the level of inflation of the bag may be changed to produce the adjustment mentioned. A detailed description of a suspension, such as suspensions 26, is found in my prior-filed copending U. S. application, Ser. No. 112,135, filed Feb. 3, 1971, now U.S. Pat. No. 3,704,898, entitled "Vehicle Axle Suspension."

It should be understood that while a specific type of adjustable suspension has been described herein, with reference made to a prior-filed patent application fully disclosing the constuction of such a suspension, various types of vertically adjustable suspensions, with and without air bags, may be used. What is important in the present invention is that the suspensions which are used in the trailer be capable of being adjusted to place the trailer frame at different selected elevations above the ground. In the particular suspension described herein, such an adjustment is made, as has already been mentioned, simply by changing the levels of inflation in air bags 60. In trailer 10, through changing these inflation levels, suspensions 26 may be adjusted to place the top of frame 24 at any selected elevation between about 24 inches and about 36 inches above the ground. In FIG. 1 the trailer frame is shown adjusted to a vertical position with the top surfaces of track members 38, 40, 42 above the plane containing the top surfaces of sills 22 and beam 18.

The track members, track extenders, and vertically adjustable suspensions herein all form parts of on-board load-transfer apparatus in trailer 10.

Referring again to FIG. 1, drawbar mechanism 30 comprises an elongated rigid subframe 64 formed from a pair of rearwardly diverging elongated members 66. In addition, the drawbar mechanism includes an inflatable air bag 68 which acts between subframe 64 and the front end of trailer frame section 24a. Previously mentioned support mechanism 32 is suitably mounted adjacent the forward ends of members 66. The rear ends of members 66 are pivoted to a transverse member in frame section 24a through transversely aligned pivot connections, such as the pivot connection shown at 70. Pivot connections 70 mount subframe 64 for swinging in an upright plane with changes in the level of inflation in air bag 68.

Suitably anchored to the front ends of members 66 in subframe 64 is a conventional hitch ring 72 which accommodates attachment to the frame in a hauling tractor.

Details of a drawbar mechanism substantially the same as mechanism 30 are described in my prior filed copending U. S. application, entitled "Trailer With Independently Adjustable-Height Frame and Drawbar Means," Ser. No. 154,336, filed June 18, 1971. Other types of drawbar mechanism may, of course, be used.

Other equipment illustrated in the drawing figures will be described along with the description which now follows of the way in which the system of the present invention may be used. Let us assume initially that home unit 12 has been suitably loaded onto the trailer for hauling to the site of foundation 14. The manner in which the home unit is supported on the trailer during hauling is illustrated in FIG. 3. In this figure, it can be seen that unit 12 is supported in a laterally centered position on frame 24 through blocks, such as blocks 74, which are suitably attached, as by nailing, to the base of the unit along opposite sides thereof. Blocks 74 rest on the outer ends of extension members 34, with retainer plates 36 guarding against lateral slippage of the unit. Through adjustments in the levels of inflation of air bags 60, 68, the desired running height may be established for frame 24, such running height being illustrated in FIG. 3 as being about 25 or 26 inches above the ground. Normally, the air bags are adjusted to assure that the frame offers a substantially level and horizontal load-support deck for a load.

The trailer, so loaded, is then hauled to the site of foundation 14, and is maneuvered to place it alongside and parallel to the appropriate foundation wall side, such as side 16d. More specifically, the trailer is maneuvered to a position with its longitudinal axis substantially parallel to and spaced from this wall side. As was indicated earlier, it is important that unit 12 be positioned with its opposite ends aligned with the opposite end walls 16a, 16b in the foundation.

Aligned pairs of foundation tracks are then set up inside the foundation, as is illustrated in FIGS. 1 and 4. Each foundation track may comprise an elongated beam 76, similar in cross section to track members 38, 40, 42 in the frame, on top of which are joined centrally disposed elongated inverted angle iron members 78 which are similar to those previously described. Beams 76 are set up in axially aligned pairs on hydraulic jacks 80 on opposite sides of foundation beam 18, with each aligned beam pair aligned with a different track member in the trailer frame. The top surfaces of beams 76, which also form track surfaces herein, are adjusted to a common elevation slightly above the level of the top surfaces of sills 22 and beam 18.

Thereafter mounted on foundation beam 18, at the locations of the confronting ends of beams 76, are suitable track joiners 82 which provide connecting track surfaces between those on the beams. Similarly, mounted on the sill which is on top of foundation wall side 16a are track joiners 84 which define track surfaces over this sill. Track joiners 84 are located adjacent the near ends of the nearest set of beams 76 in FIG. 1. Track joiners 82, 84 preferably include flat plates, the upper surfaces of which define track surfaces, with angle iron members like those already described herein joined centrally to these plates. The joiners also include suitable spaced-apart side plates which join with the first-mentioned plates and are shaped to clip securely over beam 18 and sills 22.

Beams 76, jacks 80, and track joiners 82, 84, when not set up for use, are carried on trailer 10.

Referring to FIG. 4, with the trailer properly positioned relative to foundation 14, and with the foundation tracks and joiners set up, air bags 60, 68 are extended to raise frame 24 as illustrated in the figure. Track extenders 46, 48, 50 are then unlocked from their respective associated track members, and are shifted longitudinally outwardly toward their extended and lowered positions. This situation is clearly illustrated in FIG. 4. The outer ends of the extenders which are away from foundation 14 are then each connected by means of a pin, such as pin 86 shown in FIG. 4, to an upright external support device, such as device 88, which is placed on the ground adjacent and along-side the trailer. Devices 88 preferably accommodate such attachment at several different elevations thereon. The outer ends of the track extenders which are adjacent the foundation are pinned to track joiners 84.

Carriages as contemplated herein are then attached to the underside of unit 12 in the regions where the unit extends laterally beyond track members 38, 40, 42, and over track extenders 46, 48, 50. Such carriages are shown generally at 90 in FIGS. 4, 5 and 8, with details of carriage construction clearly illustrated in the latter figure. As can be seen in FIG. 8, a carriage comprises an elongated beam 92 on the opposite sides of the center of which are mounted grooved wheels 94. Each carriage comprises a pair of such wheels. A wheel 94 includes a central groove 94a on opposite sides of which are rims 94b. The cross-sectional configuration of a groove 94a is adapted to match with the exposed surfaces of an inverted angle iron member herein. Rims 94b are adapted to ride on the track surfaces described herein, and further are adapted laterally to overlap the opposite sides of notches, such as notch 40a, and projections, such as projection 56a.

Slidably mounted on the opposite ends of a beam 92 in a carriage are attaching members 96 which are shaped to receive the bases of joists in a home unit. Tighteners 98 on members 96 may be used to secure the latter against sliding on a beam. In FIGS. 4, 5 and 8, carriages 90 are shown in conditions attached to joists 100 in home unit 12. Six such carriages are employed herein.

With carriages 90 mounted in place as just described, air bags 60, 68 are deflated to relower frame 24. With such lowering of the frame, and with the outer ends of the track extenders attached as described to supports external to the frame, the track extenders swing upwardly toward their raised positions, in which positions they are illustrated in FIG. 5. On the track extenders attaining such positions, they form longitudinal extensions to the track members in frame 24. Upward swinging of the track extenders, in addition, causes them to engage the wheels in carriages 90, with the grooves in the wheels receiving the angle iron members on the extenders, and with consequent lifting of the carriages and lifting of unit 12 off of members 34. With such lifting of unit 12, blocks 74 may be removed.

It will be apparent that under these circumstances there now exist three elongated tracks extending between and over the trailer and foundation, which tracks readily accommodate lateral shifting of unit 12 off of the trailer and onto the foundation. Such lateral shifting may be accomplished in any suitable manner, with the wheels in the carriages riding on the various track surfaces described herein, and prevented from derailing from such surfaces due to engagement of the grooves in the carriage wheels with the angle iron members. In particular, unit 12 is shifted to a position over foundation 14 such as that illustrated in dash-dot outline at 12A in FIG. 5.

With unit 12 properly positioned over the foundation it may readily be lowered onto the foundation by lowering jacks 80 and beams 76. Prior to complete lowering of the jacks, track joiners 82, 84 may be removed. And, after placing of the unit onto the foundation, beams 76 and jacks 80 may be removed and returned to the trailer. The track extenders may then be returned to their retracted positions within the track members in frame 24, and support devices 88 suitably stored on the trailer.

It is thus apparent that the system described herein permits relatively simple shifting of a load onto and off of a vehicle such as a trailer 10. Obviously, while an unloading operation has been described specifically, a loading operation is similar. With the track members and track extenders constructed as described, and with frame 24 supported through vertically adjustable suspensions, raising and lowering of a load, such as a modular home unit, is greatly facilitated. Obviously, load handling during loading and unloading operations can be accomplished with minimal strain and damage to the load.

Loads having different dimensions than those specifically mentioned herein can, of course, be handled—the specific dimensions of the various parts in the vehicle described herein not being critical.

While an embodiment of the invention has been described herein, it is appreciated that variations and modifications may be made without departing from the spirit of the invention.

I claim:

1. In a ground-traveling load-transporting vehicle including an elongated frame defining an elongated load-support deck, and ground-traveling support means for supporting the frame for travel over the ground, apparatus facilitating the transfer of a load onto and off of said deck comprising means adjacent said deck defining an elongated track which extends transversely of the frame's longitudinal axis, opposite ends of said track terminating short of the opposite side of said deck, a pair of elongated movable track extenders mounted on said frame adjacent the opposite ends of said track for movement between extended and retracted positions and between raised and lowered positions, each track extender when in its said extended and raised positions forming a longitudinal extension to an end of said track, means on each track extender accommodating detachable connection thereof to a support external to said vehicle, adjustable suspension means operatively interposed between said frame and said ground-traveling support means adjustable to suspend the former on the latter at different selected elevations above the ground, adjustment of said suspension means producing movement of said track extenders between their said raised and lowered positions with the extenders extended and connected to external supports, and at least a pair of carriages each ridable on said track and track extenders and each adapted to be detachably connected to a load on said deck in the space under the load where such extends beyond an end of said track, each carriage further being adapted to be picked up by an underlying track extender, thus to pick up the load, with the track extender extended and with adjustment of said suspension means which produces movement of the track extender from its said lowered toward its said raised position.

2. The vehicle of claim 1, wherein said means defining said track comprises an elongated tube, and said track extenders are freely and slidably received within opposite ends of said tube.

3. The vehicle of claim 2, wherein each track extender is shaped to accommodate limited vertical rocking thereof relative to said tube with the former extended from the latter.

4. An on-board system for transferring a load onto and off of a vehicle, where the vehicle includes an elongated frame defining an elongated support bed for a load, and means supporting the frame for travel over the ground and for adjustment to different elevations above the ground, said system comprising a plurality of elongated track members disposed transversely of said frame's longitudinal axis and rigidly joined in the frame at points distributed along the length of said support bed, each track member terminating short of the opposite sides of said bed and including an upwardly facing generally horizontal track surface extending along it, a pair of elongated track extender members for the opposite ends of each track member, each track extender member being mounted adjacent its associated track member for movement between extended and retracted positions and betweeen raised and lowered positions relative to such track member, and each including an upwardly facing track extension surface extending along it, a track extension surface on a track extender member forming an axially aligned longitudinal extension to a track surface on the associated track member with the track extender member in its said extended and raised positions, means on each track extender member accommodating detachable connection thereof to a support external to said vehicle with the track extender member extended, a track extender member when extended and so connected moving between its raised and lowered positions with adjustment of the elevation of said frame, and a pair of carriages for each track member and its associated track extender members ridable on the track surface and track extension surfaces thereon, and detachably connectable to the base of a load on said deck in the space under the load where such extends beyond an end of a track member, each carriage being adapted to be engaged and to be picked up by an underlying track extension surface, thus to pick up a load on said deck, with the track extenders extended, and with adjustment of the elevation of said frame which produces movement of the track extenders from their said lowered toward their said raised position.

* * * * *